US012138750B2

(12) United States Patent
Kamachi et al.

(10) Patent No.: US 12,138,750 B2
(45) Date of Patent: Nov. 12, 2024

(54) TIGHTENING TOOL CONTROL SYSTEM AND TIGHTENING TOOL

(71) Applicant: HONDA MOTOR CO., LTD., Tokyo (JP)

(72) Inventors: Hideari Kamachi, Tokyo (JP); Atsushi Shirakawa, Tokyo (JP); Hiroyuki Furuyama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 393 days.

(21) Appl. No.: 17/669,703

(22) Filed: Feb. 11, 2022

(65) Prior Publication Data

US 2022/0281081 A1 Sep. 8, 2022

(30) Foreign Application Priority Data

Mar. 4, 2021 (JP) ................................ 2021-034381

(51) Int. Cl.

*B25B 21/00* (2006.01)
*B25B 21/02* (2006.01)
*B25B 23/147* (2006.01)
*G08B 21/18* (2006.01)

(52) U.S. Cl.

CPC .......... *B25B 21/002* (2013.01); *G08B 21/187* (2013.01); *B25B 21/02* (2013.01); *B25B 23/1475* (2013.01)

(58) Field of Classification Search

CPC ... B25B 21/002; B25B 21/02; B25B 23/1475; B25B 21/00; B25B 23/147; B25B 21/026; B25B 23/14

See application file for complete search history.

(56) References Cited

FOREIGN PATENT DOCUMENTS

| | | | | |
|---|---|---|---|---|
| CN | 102159363 | A | | 8/2011 |
| CN | 109477765 | A | | 3/2019 |
| DE | 43 28 599 | A1 | | 3/1994 |
| JP | 2005-144625 | A | | 6/2005 |
| JP | 2005177919 | A | * | 7/2005 |
| JP | 2012-086284 | | | 5/2012 |
| JP | 2013-188858 | A | | 9/2013 |
| JP | 2019-38068 | A | | 3/2019 |

OTHER PUBLICATIONS

Isobe Tsuneo, Machine Translaction of JP 2005177919 A, Jul. 2005 (Year: 2024).*

Japanese Office Action dated Oct. 4, 2022 issued in corresponding Japanese application No. 2021-034381; English machine translation included (11 pages).

Chinese Office Action dated May 26, 2023 issued in corresponding application No. 202210150527.7 (6 pages).

* cited by examiner

*Primary Examiner* — Veronica Martin

(74) *Attorney, Agent, or Firm* — Rankin, Hill & Clark LLP

(57) ABSTRACT

There is provided a tightening tool control system including a tightening tool and a PC (Personal Computer) for controlling the tightening tool, the tightening tool having a registration mode for detecting a tightening posture when tightening a member and for registering the detected tightening posture in the PC.

5 Claims, 7 Drawing Sheets

TIGHTENING TOOL CONTROL SYSTEM AND TIGHTENING TOOL

INCORPORATION BY REFERENCE

The present application claims priority under 35 U.S.C. § 119 to Japanese Patent Application No. 2021-034381 filed on Mar. 4, 2021. The content of the applications is incorporated herein by reference in its entirety.

BACKGROUND OF THE INVENTION

Field of the Invention

The present invention relates to a tightening tool control system and a tightening tool.

Description of the Related Art

Conventionally, tightening tools for tightening members such as bolts and screws have been known. For example, Japanese Patent Application Laid-Open No. 2012-086284 discloses an impact wrench including a gyro sensor that detects the rotation angle of the impact wrench due to a worker's hand shaking and a controller that controls screw tightening, wherein the controller controls tightening based on the angle of hand shaking detected by the gyro sensor.

An accuracy of tightening a member is affected not only by the worker's hand shaking but also by a posture of the tightening tool in tightening the member. Japanese Patent Application Laid-Open No. 2012-086284 does not consider the posture of the impact wrench in the tightening control, and there is room for improving the accuracy of tightening.

Therefore, an object of the present invention is to improve an accuracy of tightening a member.

SUMMARY OF THE INVENTION

One aspect of achieving the above object is a tightening tool control system, including a tightening tool and a control device for controlling the tightening tool, the tightening tool having a first mode for detecting a tightening posture when tightening a member and for registering the detected tightening posture in the control device.

The above tightening tool control system may be configured such that: based on the tightening posture registered when the tightening tool is in the first mode, the control device determines a proper range in which the tightening posture is a proper posture when tightening a member; and the tightening tool has a second mode for tightening a member based on the proper range determined by the control device.

The above tightening tool control system may be configured such that: in the second mode, the tightening tool detects the tightening posture, determines success-failure of tightening a member, associates the detected tightening posture with the determination result of the success-failure of tightening, and transmits the tightening posture associated with the determination result to the control device; and the control device determines the proper range, based on the tightening posture transmitted by the tightening tool and the determination result of success-failure of tightening associated with the tightening posture in the second mode.

The above tightening tool control system may be configured such that: the tightening tool, in the second mode, detects the tightening posture, and dose not start tightening a member if the detected tightening posture is not within the proper range determined by the control device.

The above tightening tool control system may be configured such that: the control device determines the proper range for a next tightening of the tightening tool, based on a plurality of the tightening postures including the tightening posture registered this time.

The above tightening tool control system may be configured such that: the control device outputs a warning indicating a tightening failure when a determination result of success-failure of tightening indicates a failure, the determination result of success-failure of tightening being transmitted by the tightening tool.

The above tightening tool control system may be configured such that: when tightening a plurality of members in the first mode, the tightening tool registers the tightening posture associated with a tightening order number in the control device; and the control device determines the proper range for each number in the tightening order.

Another aspect of achieving the above object is a tightening tool, including an execution unit that executes a first mode for detecting a tightening posture when a member is tightened and for registering the detected tightening posture in a control device.

The aspect of the present invention can exhibit effects of improving accuracy, quality, reliability of tightening the member.

DETAILED DESCRIPTION OF THE PREFERRED EMBODIMENTS

1. Configuration of Tightening Tool Control System

Figure 1:
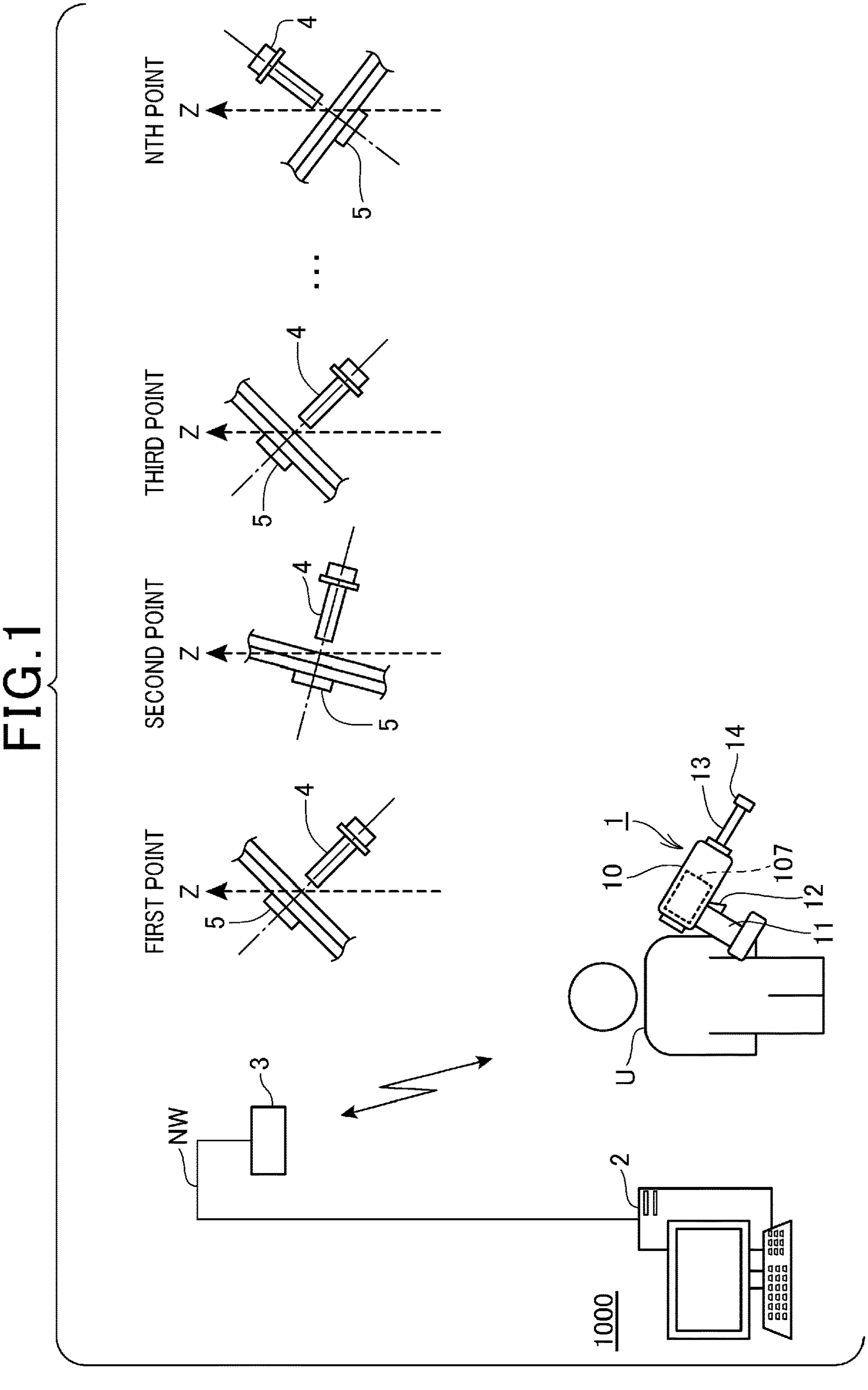
FIG. 1 is a diagram showing a configuration of a tightening tool control system.

FIG. 1 is a diagram showing a configuration of a tightening tool control system 1000.

The tightening tool control system 1000 includes a tightening tool 1 and a PC (Personal Computer) 2 that controls the tightening tool 1.

The PC2 corresponds to an example of a control device.

The tightening tool 1 is a tool for tightening a bolt 4 when, for example, a plurality of materials are fastened with a bolt 4 and a nut 5. Examples of the tightening tool 1 include an impact wrench. This embodiment illustrates a case in which the tightening tool 1 tightens the bolt 4, but the member to be tightened by the tightening tool 1 is not limited to the bolt 4, and may be another member such as a screw.

The tightening tool 1 includes a housing 10 containing a motor 107. The tightening tool 1 drives the motor 107 when an operating lever 12, provided on a grip portion 11 formed in the housing 10, is operated. When the motor 107 is driven in the tightening tool 1, a spindle 13 extending from the housing 10 rotates. An end of the spindle 13 is provided with an attachment 14, and the tightening tool 1 tightens the bolt 4 via the attachment 14 by the rotation of the spindle 13.

The tightening tool 1 includes a communication unit 101, and communicates with the PC 2 via a data transfer device 3 by the communication unit 101. The data transfer device 3 is, for example, a router, and transfers data transmitted and received between the tightening tool 1 and the PC 2 connected to the communication network NW.

The PC2 communicates with the tightening tool 1 and transmits and receives various data to and from the tightening tool 1. Furthermore, the PC 2 performs various arithmetic processes based on the data received from the tightening tool 1. FIG. 1 illustrates that the PC 2 is a desktop PC, but the PC 2 may be a notebook PC, a tablet PC, or a smartphone. When the PC 2 is configured of a portable PC such as a tablet PC or a smartphone, the PC 2 may perform short-range wireless communication with the tightening tool 1 to transmit and receive various data to and from the tightening tool 1.

This embodiment illustrates a case in which the tightening tool control system 1000 is applied in, for example, an automobile production line. In the illustrated production line, the worker U performs a tightening work of tightening the bolt 4 with the tightening tool 1. In the tightening work, the worker U tightens the bolt 4 at a total of N points from the first point to the Nth point (N is an integer of 4 or more in FIG. 1). In the tightening work, the worker U tightens the bolt 4 in the order of the first point, the second point, the third point, and finally the Nth point. This order is predetermined in the production line and is transmitted to the worker U.

FIG. 1 illustrates a Z-axis at each point where the bolt 4 is tightened. The Z axis indicates the up-down direction and the vertical direction. The positive direction of the Z axis indicates the upward direction. As shown in FIG. 1, all the N points from the first point to the Nth point do not always have the same tightening angle of the bolt 4 with respect to the Z axis.

2. Configuration of Tightening Tool

Figure 2:
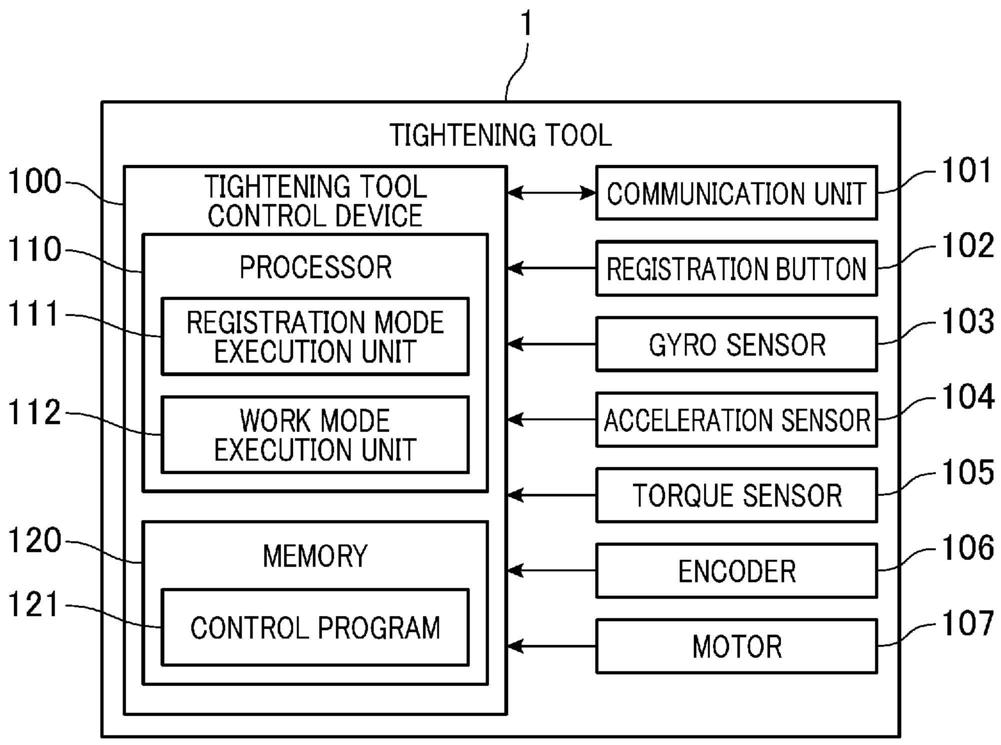
FIG. 2 is a block diagram showing a configuration of a tightening tool.

FIG. 2 is a block diagram showing the configuration of the tightening tool 1.

The tightening tool 1 includes a tightening tool control device 100. The tightening tool control device 100 includes a processor 110 such as a CPU (Central Processing Unit) or an MPU (Micro-processing Unit), and a memory 120.

The processor 110 reads and executes the control program 121 stored in the memory 120 to control each unit of the tightening tool control device 100. The processor 110 executes the control program 121 stored in the memory 120 to function as a registration mode execution unit 111 and a work mode execution unit 112.

The registration mode execution unit 111 corresponds to an example of an execution unit.

The memory 120 stores a program to be executed by the processor 110 and data to be processed by the processor 110. The memory 120 stores the control program 121 to be executed by the processor 110 and various other data. The memory 120 has a non-volatile storage area. Furthermore, the memory 120 may include a volatile storage area and form a work area of the processor 110.

The tightening tool control device 100 connects to a communication unit 101, a registration button 102, a gyro sensor 103, an acceleration sensor 104, a torque sensor 105, an encoder 106, and a motor 107. In addition, the tightening tool control device 100 may be connected to other devices.

In this embodiment, the communication unit 101, the registration button 102, the gyro sensor 103, and the acceleration sensor 104 are contained in one package, and this package is retrofitted to the tightening tool 1.

The communication unit 101 includes a communication device having a communication circuit and an antenna, and connects to a communication network NW to execute data communication.

The registration button 102 is a hardware button for registering the tightening posture, which is the posture of the tightening tool 1 in tightening, in the PC 2. When the registration button 102 receives a registration execution instruction from the worker U, the registration button 102 outputs a signal indicating that it has received the registration execution instruction to the tightening tool control device 100.

The gyro sensor 103 detects the angular velocity around the axis and outputs the detection value to the tightening tool control device 100.

The acceleration sensor 104 detects the acceleration in the axial direction and outputs the detection value to the tightening tool control device 100.

Figure 3:
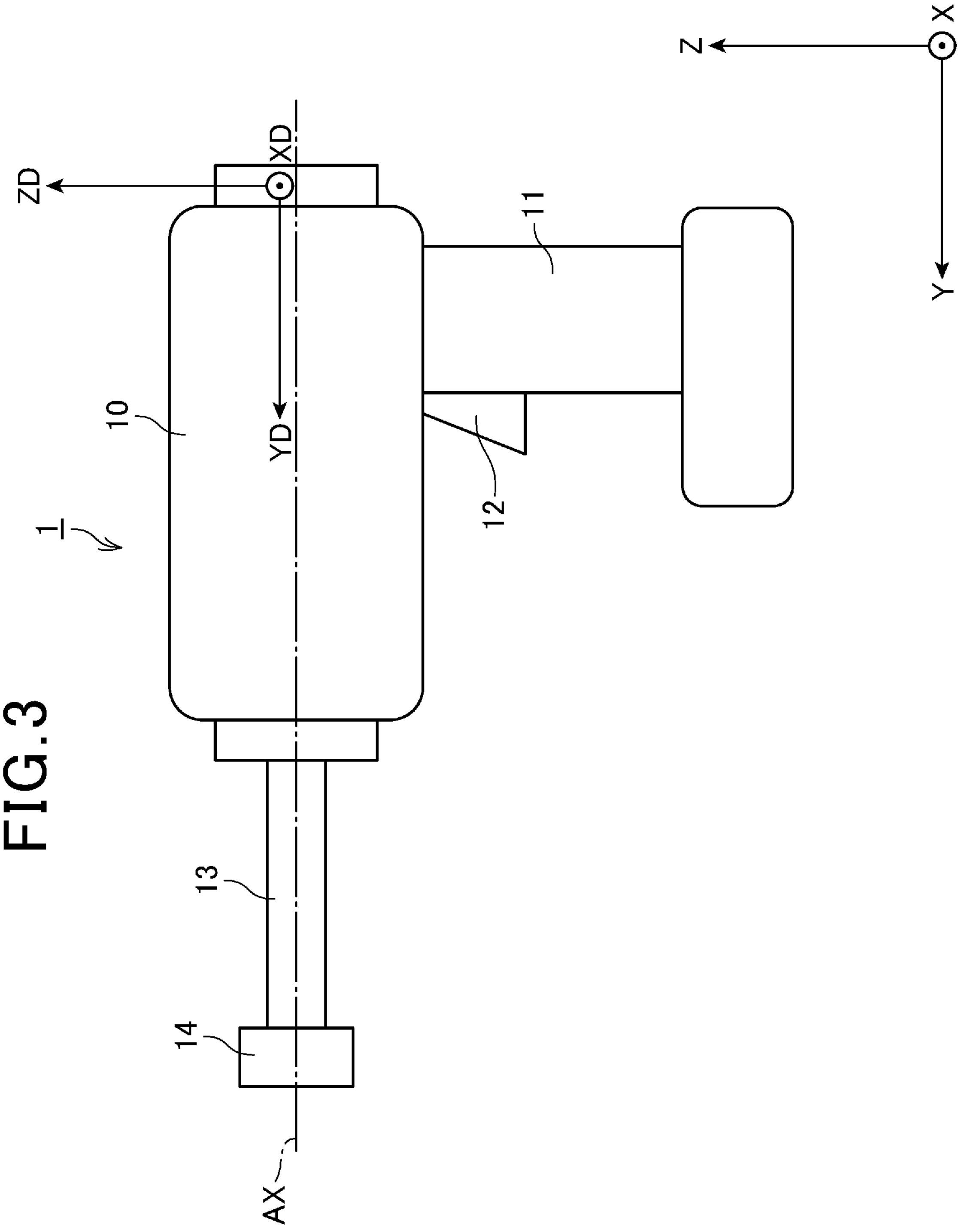
FIG. 3 is a diagram for describing detection axes of a gyro sensor and an acceleration sensor.

The following describes detection axes of the gyro sensor 103 and the acceleration sensor 104 with reference to FIG. 3.

FIG. 3 is a diagram for describing the detection axes of the gyro sensor 103 and the acceleration sensor 104.

FIG. 3 illustrates an X-axis, a Y-axis, and a Z-axis. The X-axis, Y-axis, and Z-axis are orthogonal to each other. The Z-axis indicates the up-down direction and the vertical direction. The X-axis and Y-axis are parallel to the horizontal direction. The X-axis indicates the left-right direction. The Y-axis indicates the front-rear direction. The positive direction of the Z axis indicates the upward direction. The positive direction of the X-axis indicates the right direction. The positive direction of the Y-axis indicates the forward direction.

In FIG. 3, detection axes of the gyro sensor 103 and the acceleration sensor 104 are indicated as an XD axis, a YD axis, and a ZD axis. The XD axis, YD axis, and ZD axis are orthogonal to each other. The YD axis is the same as the rotation axis AX of the spindle 13. The XD axis and the YD axis form a horizontal plane that serves as a reference for the posture of the tightening tool 1. The ZD axis is an axis perpendicular to the horizontal plane formed by the XD axis and the YD axis.

The gyro sensor 103 detects the angular velocity around the XD axis, the angular velocity around the YD axis, and the angular velocity around the ZD axis, and outputs the detection values to the tightening tool control device 100. The acceleration sensor 104 detects the acceleration in the XD axis direction, the acceleration in the YD axis direction, and the acceleration in the ZD axis direction, and outputs the detection values to the tightening tool control device 100.

The gyro sensor 103 and the acceleration sensor 104 is calibrated when the tightening tool 1 takes a posture such that the horizontal plane formed by the XD axis and the YD axis is parallel to the horizontal direction, and the grip portion 11 is located below the housing 10.

The torque sensor 105 detects the torque generated in the spindle 13 at the time of tightening, and outputs the detection value to the tightening tool control device 100.

The encoder 106 detects the rotation angle of the spindle 13 at the time of tightening, and outputs the detection value to the tightening tool control device 100.

As described above, the processor 110 functions as a registration mode execution unit 111 and a work mode execution unit 112.

The registration mode execution unit 111 sets an operation mode of the tightening tool 1 to a registration mode and executes the operation corresponding to the registration mode. The registration mode is an operation mode for registering the tightening posture, which is the basis of a work mode, in the PC 2.

The work mode execution unit 112 sets the operation mode of the tightening tool 1 to the work mode and executes the operation corresponding to the work mode. The work mode is an operation mode for setting the tightening posture to a proper posture at the time of tightening.

The registration mode corresponds to an example of a first mode. The work mode corresponds to an example of a second mode.

First, the following describes a common configuration of the registration mode execution unit 111 and the work mode execution unit 112.

Each of the registration mode execution unit 111 and the work mode execution unit 112 detects the tightening posture based on the detection value output by the gyro sensor 103, and generates the tightening posture data indicating the detected tightening posture. In this embodiment, each of the registration mode execution unit 111 and the work mode execution unit 112 detects the tilt angle of the tightening tool 1 with respect to the vertical direction, as a tightening posture, by time-integrating the angular velocity around the ZD axis.

As described above, in this embodiment, the worker U tightens the bolts 4 in the order of the first point, the second point, the third point, and finally the Nth point. Therefore, when each of the registration mode execution unit 111 and the work mode execution unit 112 of this embodiment generates the tightening posture data, each of the units associates each of the generated tightening posture data with the tightening point number indicating the number of the tightening point, and records it in the memory 120. For example, when the worker U tightens the bolt 4 at the first point, each of the registration mode execution unit 111 and the work mode execution unit 112 associates the tightening point number indicating the first with the tightening posture data generated in tightening the bolt 4, and record it in the memory 120. In the same way, for example, when the worker U tightens the bolt 4 at the Nth point, each of the registration mode execution unit 111 and the work mode execution unit 112 associates the tightening point number indicating the Nth with the tightening posture data generated in tightening the bolt 4, and record it in the memory 120. In this way, the tightening point number indicates the number in the order of tightening.

Next, the following describes each of the registration mode execution unit 111 and the work mode execution unit 112.

The first description is about the registration mode execution unit 111.

When the registration button 102 receives the registration execution instruction, the registration mode execution unit 111 transmits the tightening posture data recorded in the memory 120 to the PC 2 via the communication unit 101. The tightening posture data transmitted by the registration mode execution unit 111 is associated with the tightening point number.

The next description is about the work mode execution unit 112.

The work mode execution unit 112 performs a tightening success-failure determination for determining the success-failure of tightening. The work mode execution unit 112 associates the determination result of the tightening success-failure determination and the tightening point number with the generated tightening posture data, and record it in the memory 120. In addition, when the registration button 102 receives the registration execution instruction, the work mode execution unit 112 transmits the tightening posture data recorded in the memory 120 to the PC 2 via the communication unit 101. The tightening posture data transmitted by the work mode execution unit 112 is associated with the determination result of the tightening success-failure determination and the tightening point number. The work mode execution unit 112 receives proper range information indicating the proper range from the PC 2. The proper range is a range in which the tightening posture is a proper posture at the time of tightening. The proper range information received by the work mode execution unit 112 of this embodiment indicates the proper range for the tilt angle with respect to the vertical direction for each of the first point, the second point, the third point, and finally the Nth point. The work mode execution unit 112 detects the posture of the tightening tool 1 when tightening is not performed. This posture is hereinafter referred to as "current posture". The work mode execution unit 112 controls the start of tightening based on the detected current posture and the proper range indicated by the proper range information.

3. Configuration of PC

Figure 4:
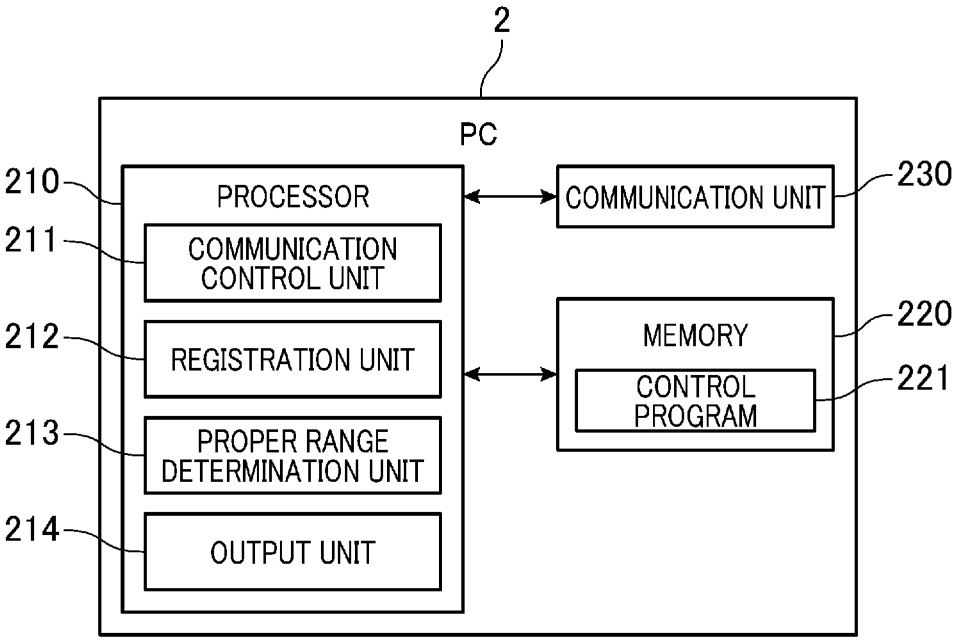
FIG. 4 is a block diagram showing a configuration of a PC (Personal Computer)

FIG. 4 is a block diagram showing the configuration of the PC2.

The PC2 includes a processor 210, a memory 220, and a communication unit 230.

The processor 210 reads and executes the control program 221 stored in the memory 220 to control each unit of the PC 2. The processor 210 executes the control program 221 stored in the memory 220 to function as a communication control unit 211, a registration unit 212, a proper range determination unit 213, and an output unit 214.

The memory 220 stores a program to be executed by the processor 210 and data to be processed by the processor 210. The memory 220 stores the control program 221 to be executed by the processor 210 and various other data. The memory 220 has a non-volatile storage area. The memory 220 may also include a volatile storage area to form a work area for the processor 210.

The communication unit 230 includes a communication device having a communication circuit, an antenna, and the like, and connects to a communication network NW to execute data communication.

As described above, the processor 210 functions as a communication control unit 211, a registration unit 212, a proper range determination unit 213, and an output unit 214.

The communication control unit 211 communicates with the tightening tool 1 via the communication unit 230.

The registration unit 212 stores the tightening posture data received from the tightening tool 1 in the memory 220 to register the tightening posture detected by the tightening tool 1.

The proper range determination unit 213 determines the proper range of tilt angle with respect to the vertical direction for each of the first point, the second point, the third point, and finally the Nth point. The following describes the operation of the proper range determination unit 213 in detail with reference to FIG. 5.

Figure 5:
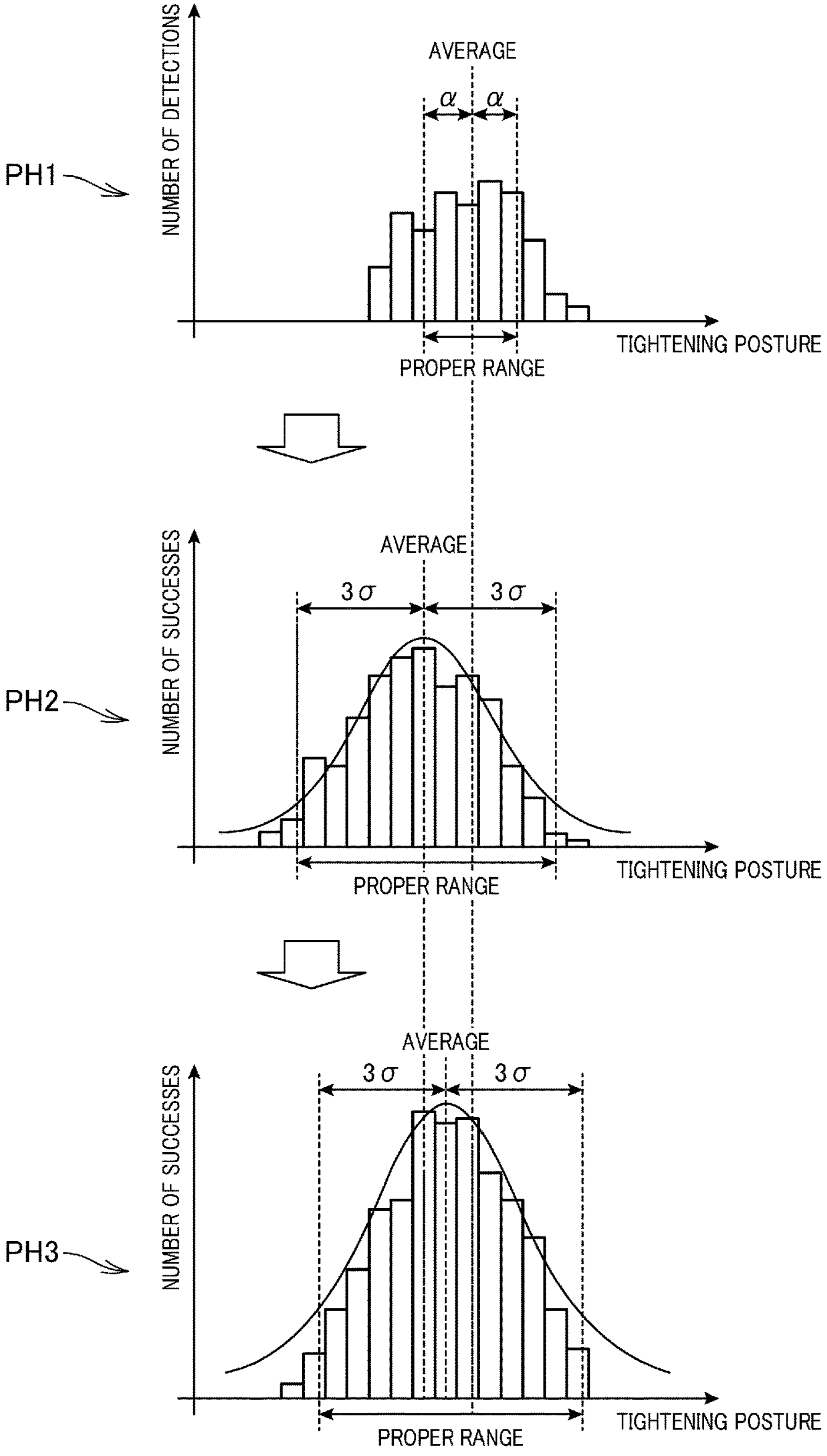
FIG. 5 is a diagram for describing a determination of a proper range.

FIG. 5 is a diagram for describing the determination of the proper range.

The proper range determination unit 213 determines the proper range according to phases for determining the proper range for each of the first point, the second point, the third point, and finally the Nth point. In this embodiment, the phases for determining the proper range shifts in the order of a first phase, a second phase, and a third phase for each of the first point, the second point, the third point, and finally the Nth point. An individual phase shift, which is based on the number of tightening posture data associated with the determination result of the tightening success, may have different shift timing for each of the first point, second point, third point, and finally Nth point.

In FIG. 5, a reference numeral PH1 indicates a proper range determined in the first phase. A reference numeral PH2 indicates a proper range determined in the second phase. A reference numeral PH3 indicates a proper range determined in the third phase.

In the first phase, the proper range determination unit 213 determines the proper range based on the tightening posture registered by the tightening tool 1 in the registration mode. The proper range determination unit 213 calculates the average of the tightening postures detected in the registration mode, and sets the proper range to the range of $\pm\alpha$ degrees from the calculated average. $\alpha$ is set arbitrarily.

The first phase shifts to the second phase when the tightening posture data associated with the determination result of the tightening success is recorded in the memory 220 by a predetermined number of data or more.

In the second phase, the proper range determination unit 213 calculates the average of the tightening posture and the standard deviation from the average based on the tightening posture data that are associated with the determination result of the tightening success and have the same number of the associated tightening point number. Then, the proper range determination unit 213 sets the proper range to the range of $\pm3\sigma$ from the calculated average. Note that $\sigma$ is the calculated standard deviation.

The second phase shifts to the third phase when the tightening posture data associated with the determination result of the tightening success is recorded in the memory 220 at the stage of the second phase.

In the third phase, each time the tightening posture data associated with the determination result of the tightening success is recorded in the memory 220, the proper range determination unit 213 determines the proper range based on the proper range determined last time and the tightening posture indicated by the tightening posture data recorded this time. The proper range determination unit 213 calculates the average of the tightening postures and the standard deviation from this average based on the average of the tightening postures calculated last time, the standard deviation calculated last time, and the tightening postures indicated by the tightening posture data recorded this time. Then, the proper range determination unit 213 sets the proper range to the range of $\pm3\sigma$ from the calculated average of the tightening postures.

The proper range determination unit 213 generates proper range information when the unit determines the proper range for each of the first point, the second point, the third point, and finally the Nth point. The generated proper range information indicates the determined proper range for each of the first point, the second point, the third point, and finally the Nth point. The proper range determination unit 213 outputs the generated proper range information to the communication control unit 211. The communication control unit 211 transmits the proper range information to the tightening tool 1. The tightening tool 1, which has received the proper range information from the communication unit 101, records the received proper range information in the memory 120.

When the communication control unit 211 receives the tightening failure information from the tightening tool 1, the output unit 214 outputs an alarm indicating the tightening failure. The output mode may be display or audio output. When the output mode is display, the PC 2 includes a display, and when the output mode is audio output, the PC 2 includes a speaker.

4. Operation of Tightening Tool Control System

The following describes the operation of the tightening tool control system 1000.

The first description is about the operation of the tightening tool control system 1000 when the tightening tool 1 is in the registration mode.

Figure 6:
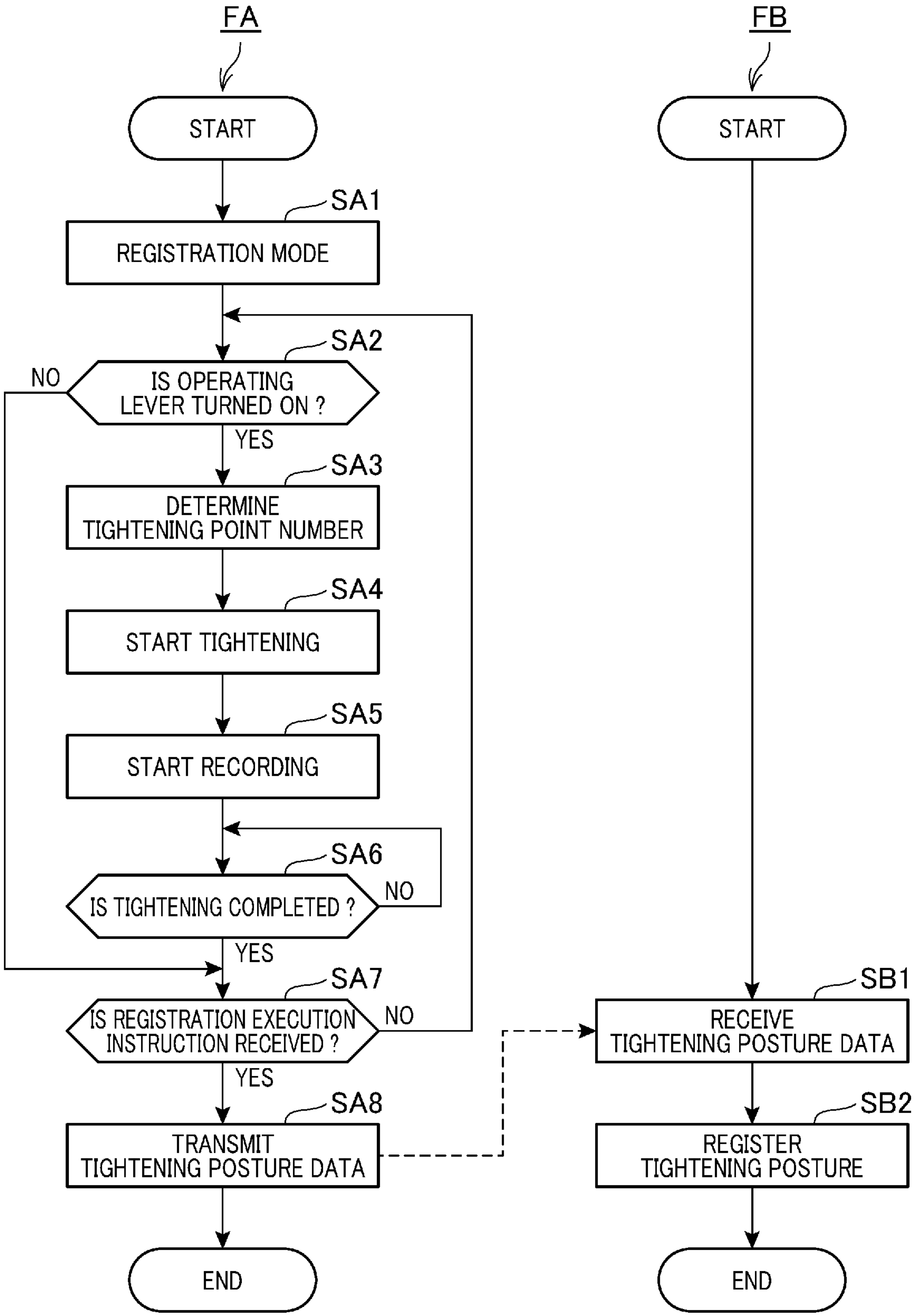
FIG. 6 is a flowchart showing operation of a tightening tool control system.

FIG. 6 is a flowchart showing operation of the tightening tool control system 1000. In FIG. 6, the flowchart FA shows operation of the tightening tool 1, and the flowchart FB shows operation of the PC 2.

As shown in the flowchart FA, the registration mode execution unit 111 of the tightening tool 1 sets the operation mode of the tightening tool 1 to the registration mode (step SA1).

The registration mode execution unit 111 determines whether the operating lever 12 is turned on (step SA2).

When the operating lever 12 is turned on, the worker U positions the tightening tool 1 at a position corresponding to the tightening point. For example, when the determination in step SA2 is the first determination after the start of the operation of the flowchart FA, the worker U positions the tightening tool 1 at a position corresponding to the first point.

When determining that the operating lever 12 is not turned on (step SA2: NO), the registration mode execution unit 111 performs the process of step SA7.

On the other hand, when determining that the operating lever 12 is turned on (step SA2: YES), the registration mode execution unit 111 determines the tightening point number (step SA3). The tightening point number increments by one each time the process of step SA3 is performed.

The registration mode execution unit 111 then drives the motor 107 and starts tightening the bolt 4 (step SA4).

When the registration mode execution unit 111 starts tightening, the unit starts recording the tightening posture data in the memory 120 (step SA5). Recording of the tightening posture data in the memory 120 is repeated at a predetermined cycle from the start to the end of the tightening. Additionally, the recorded tightening posture data is associated with the tightening point number determined in step SA3.

Next, the registration mode execution unit 111 determines whether the tightening is completed (step SA6). For example, the registration mode execution unit 111 determines that the tightening is completed when the operating lever 12, which has been turned on, is turned off.

When determining that the tightening has not been completed (step SA6: NO), the registration mode execution unit 111 performs determination in step SA6 again.

On the other hand, when determining that the tightening is completed (step SA6: YES), the registration mode execution unit 111 determines whether the registration button 102 has received the registration execution instruction (step SA7).

When determining that the registration button 102 has not received the registration execution instruction (step SA7: NO), the registration mode execution unit 111 performs the processing of step SA2 and thereafter again.

On the other hand, when determining that the registration button 102 has received the registration execution instruction (step SA7: YES), the registration mode execution unit 111 transmits all the tightening posture data recorded in the memory 120 to the PC 2 (step SA8). Here, the tightening posture data to be transmitted is associated with the tightening point number. The transmitted tightening posture data is deleted from the memory 120.

As shown in the flowchart FB, the communication control unit 211 of the PC 2 receives the tightening posture data from the tightening tool 1 (step SB1).

Then, the registration unit 212 records the tightening posture data received by the communication control unit 211 in the memory 220. In other words, the registration unit 212 registers the tightening posture detected by the tightening tool 1 (step SB2). The registration unit 212 records the tightening posture data with the tightening point number associated therewith, in the memory 220.

In this embodiment, the worker U sets the tightening tool 1 in the registration mode and tightens the bolts 4 at each of the first point, second point, third point, and finally Nth point in this order. Therefore, the tightening postures for each of the first point, the second point, the third point, and finally the Nth point are registered in the PC 2.

Assuming that the phase with the proper range to be determined is the first phase, when the registration unit 212 processes step SB2, the proper range determination unit 213 then determines the proper range for each of the first point, the second point, the third point, and finally the Nth point, based on the tightening posture registered in step SB2. Then, the proper range determination unit 213 determines the proper range, and subsequently generates the proper range information. Then, the communication control unit 211 transmits the proper range information generated by the proper range determination unit 213 to the tightening tool 1. The tightening tool 1 records the received proper range information in the memory 120.

The following describes the operation of the tightening tool control system 1000 when the tightening tool 1 is in the work mode.

Figure 7:
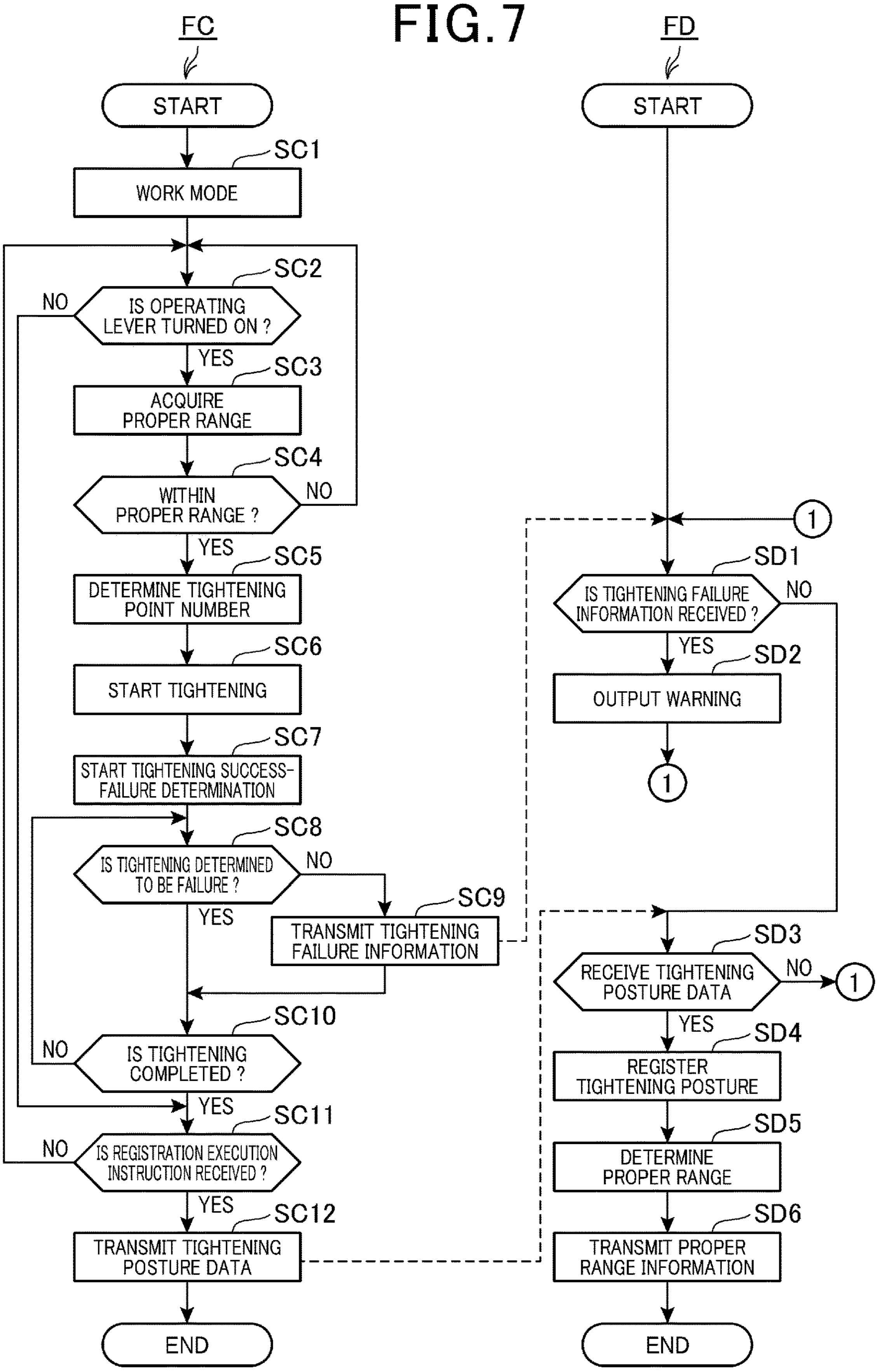
FIG. 7 is a flowchart showing operation of a tightening tool control system.

FIG. 7 is a flowchart showing operation of the tightening tool control system 1000. In FIG. 7, the flowchart FC shows the operation of the tightening tool 1, and the flowchart FD shows the operation of the PC 2.

In the flowchart shown in FIG. 7, it is assumed that the tightening tool 1 is in the work mode. In other words, in the flowchart of FIG. 7, the processor 210 functions as the work mode execution unit 112. Furthermore, in the flowchart of FIG. 7, it is assumed that the tightening tool 1 receives the proper range information from the PC 2 and records it in the memory 120.

As shown in the flowchart FC, the work mode execution unit 112 of the tightening tool 1 sets the operation mode of the tightening tool 1 to the work mode (step SC1).

The work mode execution unit 112 determines whether the operating lever 12 is turned on (step SC2).

When the operating lever 12 is turned on, the worker U positions the tightening tool 1 at a position corresponding to the tightening point. For example, when the determination in step SC1 is the first determination after the start of the operation of the flowchart FC, the worker U positions the tightening tool 1 at a position corresponding to the first point.

When determining that the operating lever 12 is not turned on (step SC2: NO), the work mode execution unit 112 performs the process of step SC11.

On the other hand, when determining that the operating lever 12 is turned on (step SC2: YES), the work mode execution unit 112 acquires a proper range corresponding to the tightening point from the proper range information recorded in the memory 120 (Step SC3). For example, when the worker U tightens the first point, the work mode execution unit 112 acquires the proper range of the first point from the proper range information recorded in the memory 120.

In step SC3, for example, the proper range information has the proper range recorded according to the predetermined tightening order, and the work mode execution unit 112 performs the process of step SC3 based on the order of the proper range in the proper range information and the number of times that the operating lever 12 is turned on after the work mode is set.

Then, the work mode execution unit 112 determines whether the current posture of the tightening tool 1 is within the proper range acquired in step SC3 (step SC4).

When determining that the current posture of the tightening tool 1 is not within the proper range (step S3: NO), the work mode execution unit 112 performs the process of step SC1 again without starting the tightening of the bolt 4 again.

In this embodiment, the worker U sets the tightening tool 1 in the work mode and tightens the bolts 4 at each of the first point, second point, third point, and finally Nth point in this order. The process of this step SC3 can prevent the worker U from tightening the bolts 4 in an order different from the predetermined order. This can prevent tightening the bolt 4 in a wrong order or forgetting to tighten the bolt 4 on the production line. Furthermore, this eliminates the need for the host device to monitor the posture of the tightening tool 1 by communication, and can prevent the worker U from tightening the bolts 4 in an order different from the predetermined order even in tightening work inside a metal body of an automobile or the like.

When determining that the current posture of the tightening tool 1 is within the proper range (step SC4: YES), the work mode execution unit 112 determines the tightening point number (step SC5). The tightening point number increments by one each time the process of step SC5 is performed.

Then, the work mode execution unit 112 drives the motor 107 and starts tightening the bolt 4 (step SC6).

In addition, the work mode execution unit 112 starts the tightening success-failure determination (step SC7). The tightening success-failure determination determines whether the tightening is successful. The work mode execution unit 112 repeats the tightening success-failure determination at a predetermined cycle from the start to the end of the tightening.

The work mode execution unit 112 is performed based on the torque detected by the torque sensor 105, the acceleration of each axis detected by the acceleration sensor 104, and the rotation angle detected by the encoder 106. The work mode execution unit 112 determines whether each of the torque, the acceleration, and the rotation angle is within a predetermined range. If the work mode execution unit 112 determines that at least one of the torque, the acceleration, and the rotation angle is not within the predetermined range, the work mode execution unit 112 determines that the tightening fails. If not, the work mode execution unit 112 determines that the tightening is successful.

When the work mode execution unit 112 starts tightening, the unit starts recording the tightening posture data in the memory 120 (step SC7). Recording of the tightening posture data in the memory 120 is repeated at a predetermined cycle from the start to the end of the tightening. In addition, the recorded tightening posture data is associated with the tightening point number determined in step SC5 and the determination result of the tightening success-failure determination.

The work mode execution unit 112 determines whether the tightening has failed in the tightening success-failure determination (step SC8).

When determining that the tightening has failed in the tightening success-failure determination (step SC8: NO), the work mode execution unit 112 transmits the tightening failure information indicating that the tightening has failed to the PC2 (step S9).

When the work mode execution unit 112 does not determine that the tightening has failed in the tightening success-failure determination (step S8: YES), or when the unit transmits tightening failure information, the unit determines whether the tightening is completed (step SC10). For example, the work mode execution unit 112 determines that the tightening is completed when the operating lever 12, which has been turned on, is turned off.

When determining that the tightening has not been completed (step SC10: NO), the work mode execution unit 112 performs determination in step SC8 again.

On the other hand, when determining that the tightening is completed (step SC10: YES), the work mode execution unit 112 determines whether the registration button 102 has received the registration execution instruction (step SC11).

When determining that the registration button 102 has not received the registration execution instruction (step SC11: NO), the work mode execution unit 112 again performs the process of step SC2 and thereafter.

On the other hand, when determining that the registration button 102 has received the registration execution instruction (step SC11: YES), the work mode execution unit 112 transmits the tightening posture data recorded in the memory 120 to the PC2 (step SC12).

As shown in the flowchart FD, the communication control unit 211 of the PC 2 determines whether it has received the tightening failure information from the tightening tool 1 (step SD1).

When the communication control unit 211 determines that it has received the tightening failure information (step SD1: YES), the output unit 214 outputs a warning (step SD2).

When the communication control unit 211 determines that it has not received the tightening failure information (step SD2: NO), the unit determines whether it has received the tightening posture data (step SD3).

When the communication control unit 211 determines that it has received the tightening posture data (step SD3: YES), the registration unit 212 records the tightening posture data received by the communication control unit 211 in the memory 220. In other words, the registration unit 212 registers the tightening posture detected by the tightening tool 1 in the work mode (step SD4). The registration unit 212 records the tightening posture data in the memory 120 in a state in which the determination result of the tightening success-failure determination and the tightening point number are associated with each other.

In this embodiment, the worker U sets the tightening tool 1 in the work mode and tightens the bolts 4 at each of the first point, second point, third point, and finally Nth point in this order. Therefore, the tightening postures for each of the first point, the second point, the third point, and finally the Nth point are registered in the PC 2.

As shown in FIG. 5, the proper range determination unit 213 determines the proper range based on the phase (step SD5) for each of the first point, the second point, the third point, and finally the Nth point.

Next, the proper range determination unit 213 transmits the proper range information indicating the determined proper range to the tightening tool 1 (step SD6).

5. Other Embodiments

The above-described embodiment illustrates the case in which the tightening posture detected by the tightening tool 1 is a tilt angle with respect to the vertical direction. However, the tightening posture detected by the tightening tool 1 is not limited to the tilt angle with respect to the vertical direction, and may include at least one of the tilt angle with respect to the left-right direction and the tilt angle with respect to the front-rear direction. In this case, the proper range determination unit 213 determines the proper range for the tilt angle with respect to the vertical direction, and the proper range for at least one of the tilt angle in the left-right direction and the tilt angle in the front-rear direction, for each of the first point, the second point, the third point, and finally the Nth point.

Furthermore, in the above-described embodiment, the tightening success-failure determination determines whether the tightening is a success or failure, depending on whether each of the torque, the acceleration, and the rotation angle is within a predetermined range. This predetermined range may be a range acquired from the PC 2 by the tightening tool 1, or may be a range registered in advance in the tightening tool 1. This predetermined range may be a range reflecting a learning result obtained in a way such that PC 2 or the tightening tool 1: collects the torque, acceleration, and rotation angle when the tightening is determined to be successful; and learns the collected values to optimize them by statistical methods, for example. The configuration, which includes learning for optimization, may include a configuration in which the worker U manually determines success-failure of tightening, in addition to a configuration in which success-failure of tightening is automatically determined as in the above embodiment. This enables the PC 2 or the tightening tool 1 to collect the determination of the success-failure of tightening made by the worker U, and thereby can improve the determination accuracy when success-failure of tightening is automatically determined.

Furthermore, the above-described embodiment illustrates the case in which the proper range determined in the second phase and the third phase is in the range of $\pm 3\sigma$ from the average. However, the proper range determined in the second phase and the third phase is not limited to $\pm 3\sigma$ from the average, and may be, for example, $\pm 2\sigma$ or $\pm 3.5\sigma$.

Furthermore, the above-described embodiment is configured such that: in the tightening success-failure determination, whether each of the torque, acceleration, and rotation angle is within the predetermined range determines whether the tightening is success or failure. However, the determination elements used for the tightening success-failure determination are not limited to the torque, the acceleration, and the rotation angle. Furthermore, the determination element used for the tightening success-failure determination may include different kinds of determination elements or less determination elements.

Furthermore, FIGS. 2 and 4 are schematic views showing the functional configurations of the tightening tool 1 and the PC 2 classified by the main processing contents, and do not limit the configuration of the tightening tool 1 and the PC2. For example, the processing of the components included in the processor 110 may be executed by one hardware unit or may be executed by a plurality of hardware units. The same applies to the processor 210. In addition, each process shown in FIGS. 6 and 7 may be executed by one program or may be executed by a plurality of programs.

Furthermore, the control program 121 executed by the processor 110 can be materialized in a state in which the control program 121 is recorded on a portable information recording medium. Examples of the information recording medium include a magnetic recording medium such as a hard disk, an optical recording medium such as a CD, and a semiconductor storage device such as a USB (Universal Serial Bus) memory or an SSD (Solid State Drive), and can also include other recording media. The tightening tool control device 100 may read the control program 121 from the information recording medium and execute it. The same applies to the control program 221.

In addition, the operation step units shown in FIGS. 6 and 7 are divided according to the main processing contents in order to facilitate understanding of the operation of each device of the tightening tool control system 1000, and is not limited by the way of dividing the processing unit or the name. The operation step units may be divided into more step units depending on the processing contents. Alternatively, the operation step units may be divided so that one step unit may include more processes. Moreover, the order of the steps may be changed as appropriate.

6. Configurations Supported by the Above Embodiments

The above embodiments are specific examples of the following configurations.

Item 1 A tightening tool control system, including a tightening tool and a control device for controlling the tightening tool, the tightening tool having a first mode for detecting a tightening posture when tightening a member and for registering the detected tightening posture in the control device.

According to the tightening tool system in item 1, registering the tightening posture enables utilizing the posture of the tightening tool in tightening the member. This enables the tightening tool to tighten the member in consideration of the tightening posture and to improve the accuracy of tightening the member.

Item 2 The tightening tool control system according to item 1, wherein: based on the tightening posture registered when the tightening tool is in the first mode, the control device determines a proper range in which the tightening posture is a proper posture when tightening a member; and the tightening tool has a second mode for tightening a member based on the proper range determined by the control device.

According to the tightening tool control system in item 2, the tightening tool has the second mode, so that the tightening tool can tighten the member in the proper tightening posture to improve the accuracy of tightening the member.

Item 3 The tightening tool control system according to item 2, wherein: in the second mode, the tightening tool detects the tightening posture, determines success-failure of tightening a member, associates the detected tightening posture with the determination result of the success-failure of tightening, and transmits the tightening posture associated with the determination result to the control device; and the control device determines the proper range, based on the tightening posture transmitted by the tightening tool and the determination result of success-failure of tightening associated with the tightening posture in the second mode.

According to the tightening tool control system of item 3, determining the proper range based on the success-failure of tightening enables the proper range to be determined to be set in a range for more proper posture when the member is tightened. This can further improve the accuracy of tightening the member.

Item 4 The tightening tool control system according to item 3, wherein the tightening tool, in the second mode, detects a current posture of the tightening tool, and dose not start tightening a member if the detected current posture is not within the proper range determined by the control device.

According to the tightening tool control system in item 4, tightening of the member does not start when the tightening posture is improper, so that problems such as diagonal tightening can be prevented, further improving the accuracy of tightening the member.

Item 5 The tightening tool control system according to any one of items 3 and 4, wherein the control device determines the proper range for a next tightening of the tightening tool, based on a plurality of the tightening postures including the tightening posture registered this time.

According to the tightening tool control system in item 5, the proper range to be used in the next tightening, can be determined to be a more proper range than the proper range used in tightening this time. This can further improve the accuracy of tightening the member.

Item 6 The tightening tool control system according to any one of items 3 to 5, wherein the control device outputs a warning indicating a tightening failure when a determination result of success-failure of tightening indicates a failure, the determination result of success-failure of tightening being transmitted by the tightening tool.

According to the tightening tool control system in item 6, if tightening fails, a person, who tightens a member by a tightening tool, can know that the tightening has failed, so that the person can shorten the time from the failure of tightening the member to the improvement.

Item 7 The tightening tool control system according to any one of items 2 to 6, wherein: when tightening a plurality of members in the first mode, the tightening tool registers the tightening posture associated with a tightening order number in the control device; and the control device determines the proper range for each number in the tightening order.

According to the tightening tool control system in item 7, if the tightening order is predetermined, the members can be tightened according to this order, which can improve the accuracy of tightening the member if the tightening order of the production line etc. is predetermined.

Item 8 A tightening tool, including an execution unit that executes a first mode for detecting a tightening posture when a member is tightened and for registering the detected tightening posture in a control device.

The tightening tool in item 8 exhibits the same effect as the tightening tool control system described in item 1.

REFERENCE SIGNS LIST

1 . . . tightening tool, 2 . . . PC (control device), 4 . . . bolt (member), 111 . . . registration mode execution unit (execution unit), 1000 . . . tightening tool control system

What is claimed is:

1. A tightening tool control system for tightening a member, comprising a tightening tool and a control device for controlling the tightening tool, wherein the tightening tool includes a first mode and a second mode, the second mode being for tightening the member based on a proper range in which a tightening posture is a proper posture when tightening the member, wherein in the first mode, the tightening tool detects a first mode tightening posture when tightening the member and registers the first mode tightening posture in the control device, in the second mode, the tightening tool detects a second mode tightening posture, determines a success-failure of tightening the member, associates the second mode tightening posture with a determination result of the success-failure of tightening, and transmits the second mode tightening posture associated with the determination result to the control device, and the control device:

in a first phase, determines the proper range in which the tightening posture is the proper posture when tightening the member based on the first mode tightening posture registered when the tightening tool is in the first mode;

records, in a memory, the second mode tightening posture associated with the determination result when the second mode tightening posture associated with the determination result is associated with a successful determination result of tightening;

and when a plurality of the second mode tightening posture is recorded in the memory and the plurality of the second mode tightening posture is a predetermined number or more, shifts to a second phase for determining the proper range, and determines the proper range in the second phase based on the plurality of the second mode tightening posture, wherein the tightening tool includes a first processor, and the first processor is configured to:

detect the first mode tightening posture with a sensor when the tightening tool is tightening the member in the first mode;

register the first mode tightening posture in the memory of the control device;

detect the second mode tightening posture with the sensor when the tightening tool is tightening the member in the second mode;

associate the second mode tightening posture with the determination result of the success-failure of tightening;

transmit the second mode tightening posture associated with the determination result to the control device; and cause the control device to record, in the memory, the second mode tightening posture associated with the determination result when the second mode tightening posture associated with the determination result is associated with the successful determination result of tightening, and the control device includes a second processor, and the second processor is configured to:

in the first phase, determine the proper range, based on the first mode tightening posture registered in the memory; and when the plurality of the second mode tightening posture, recorded in the memory, becomes the predetermined number or more, shift from the first phase to the second phase in which the proper range is determined based on the plurality of the second mode tightening posture.

2. The tightening tool control system according to claim 1, wherein the first processor of the tightening tool, in the second mode, detects a current posture of the tightening tool with the sensor, and does not start tightening the member if the detected current posture is not within the proper range determined by the second processor of the control device.

3. The tightening tool control system according to claim 1, wherein the second processor of the control device determines the proper range for a next tightening of the tightening tool based on data including a most current tightening of the member by the tightening tool.

4. The tightening tool control system according to claim 1, wherein the second processor of the control device outputs a warning indicating a tightening failure when the determination result of the success-failure of tightening indicates a failure, the determination result of the success-failure of tightening being transmitted by the first processor of the tightening tool.

5. The tightening tool control system according to claim 1, wherein when tightening a plurality of members in the first mode, the first processor of the tightening tool registers a tightening posture associated with a tightening order number in a tightening order in the control device, and the second processor of the control device determines the proper range for each number in the tightening order.

* * * * *